Nov. 26, 1935.  J. T. SCOTT  2,022,257
APPARATUS FOR MAKING ELECTRIC FISH WIRE
Filed Oct. 28, 1932.  4 Sheets-Sheet 1
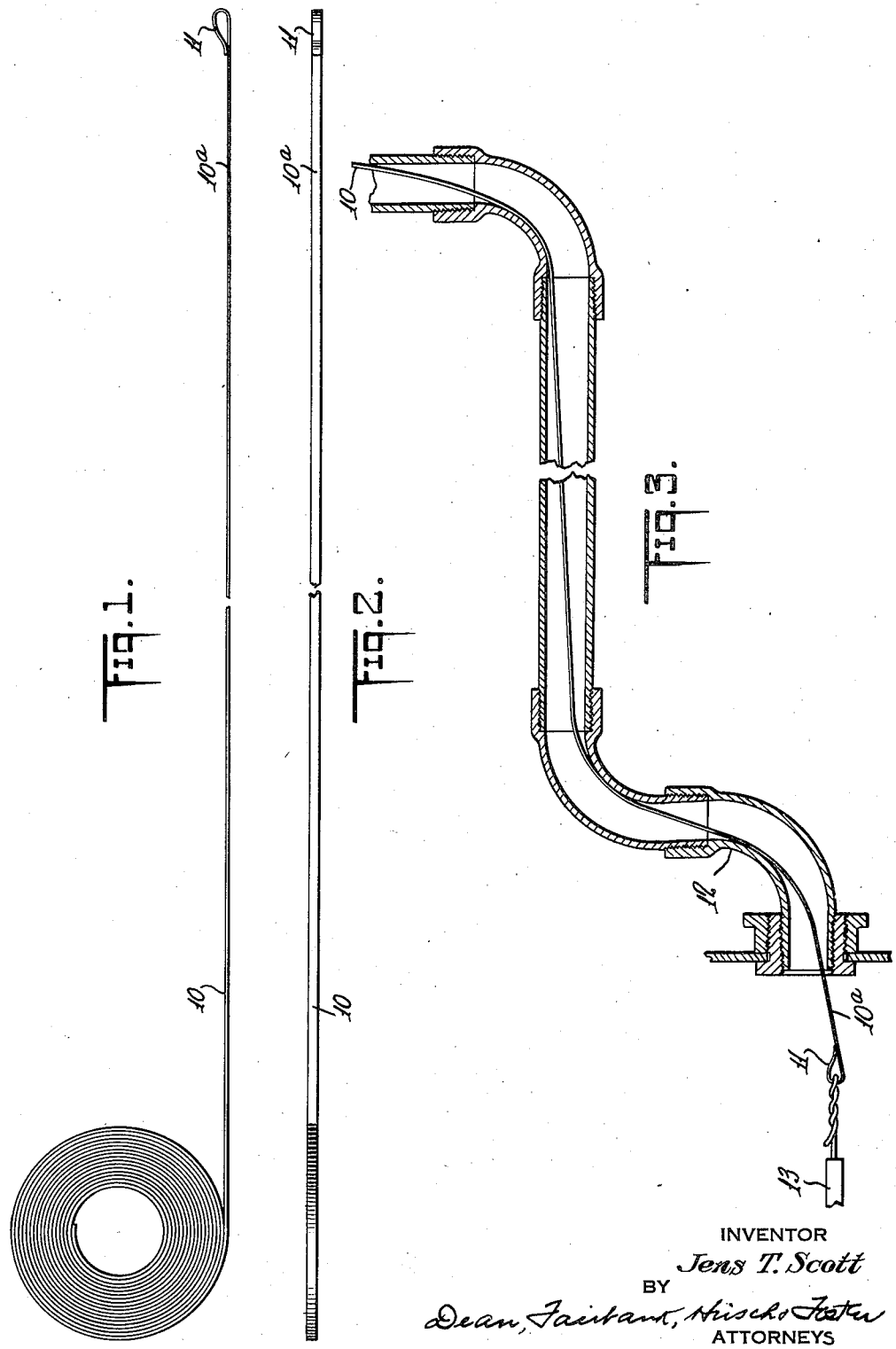
INVENTOR
Jens T. Scott
BY
Dean, Fairbank, Hirsch, Foster
ATTORNEYS Nov. 26, 1935.  J. T. SCOTT  2,022,257
APPARATUS FOR MAKING ELECTRIC FISH WIRE
Filed Oct. 28, 1932  4 Sheets-Sheet 2
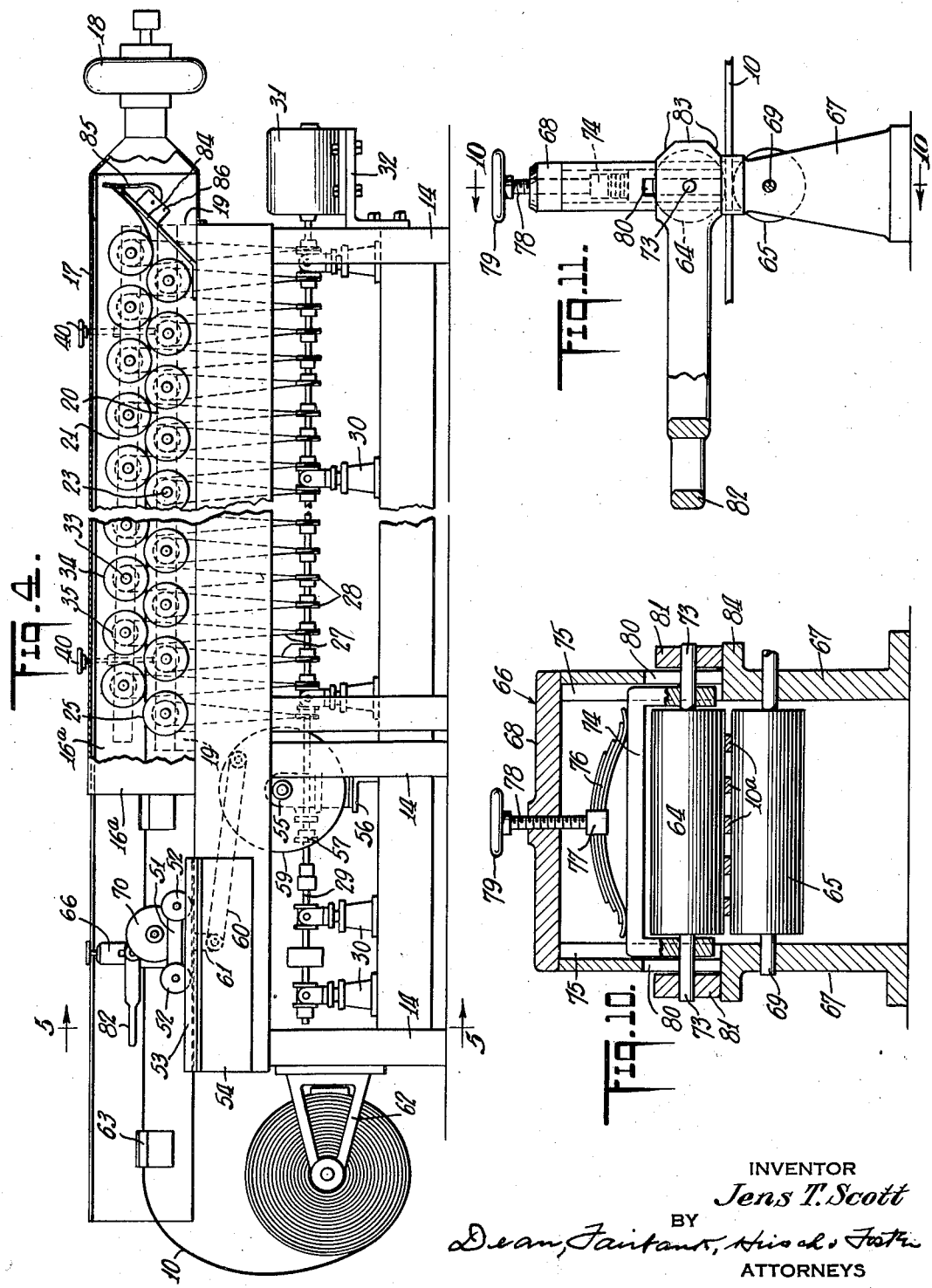
INVENTOR
Jens T. Scott
BY
Dean, Fairbank, Hirsch & Foster
ATTORNEYS

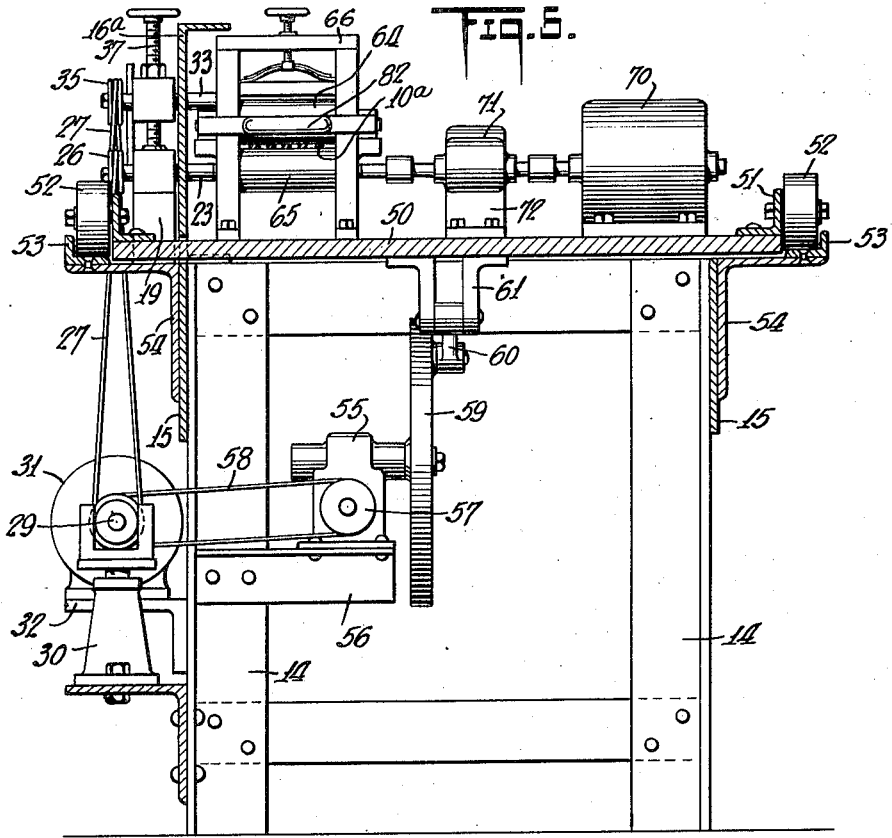
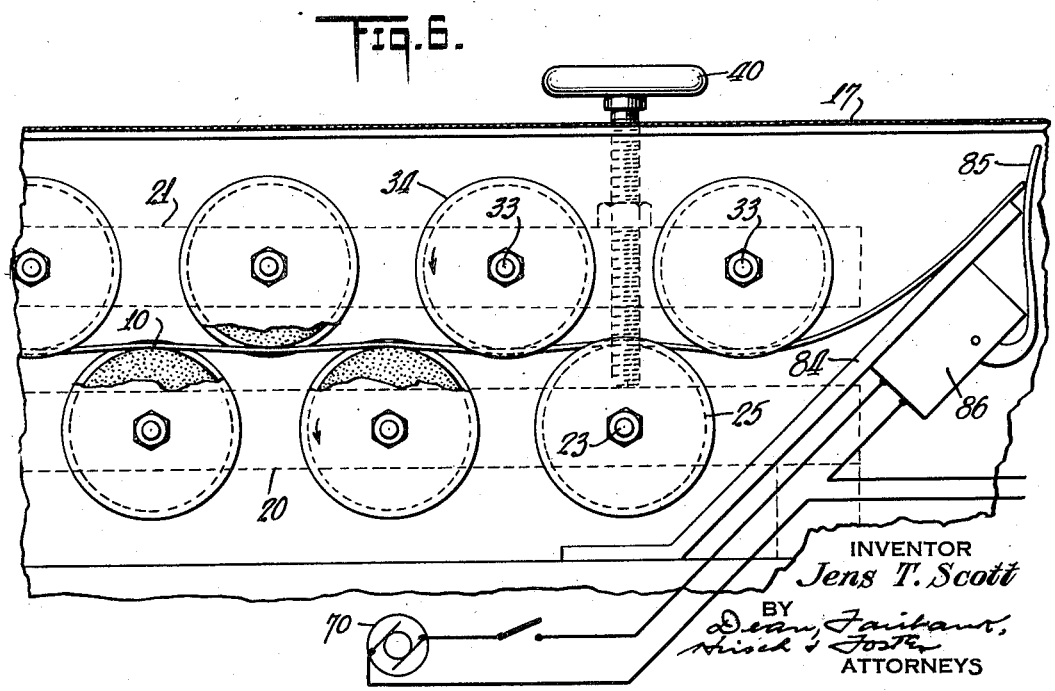

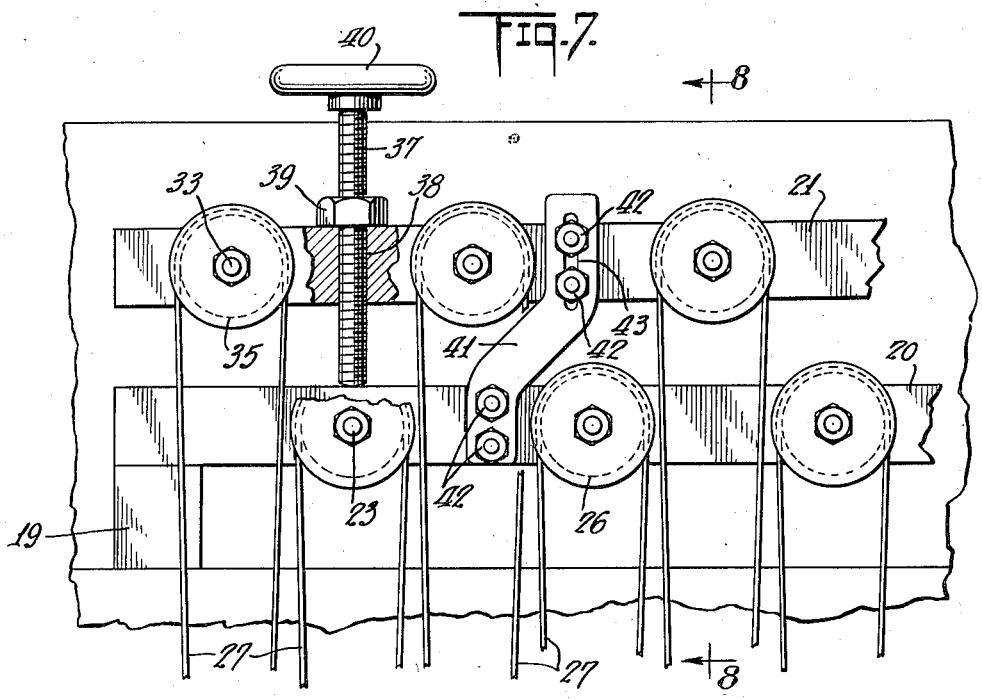
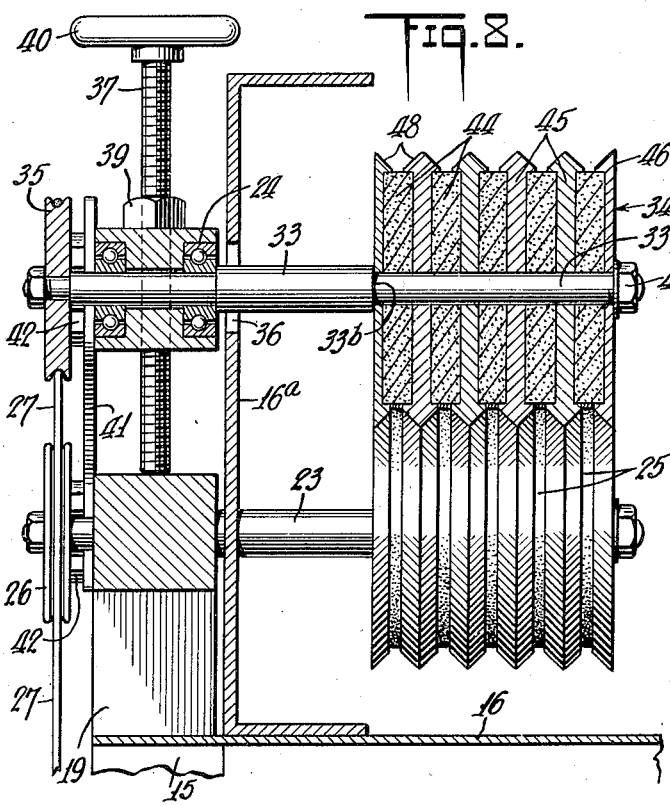
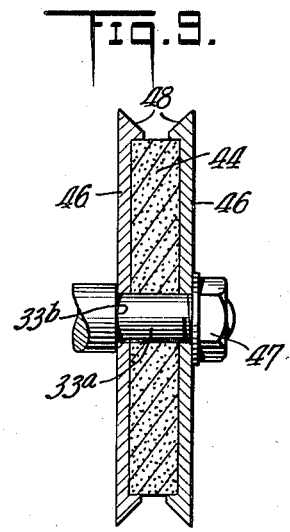

Patented Nov. 26, 1935

2,022,257

UNITED STATES PATENT OFFICE 2,022,257

APPARATUS FOR MAKING ELECTRIC FISH WIRE

Jens T. Scott, Brooklyn, N. Y.

Application October 28, 1932, Serial No. 639,960

14 Claims. (C. 51—92)

My present invention considered from one aspect is concerned with wire fishing implements such as are employed in drawing a length of wire through an electric conduit in a building structure.

Considered from another aspect the invention is concerned with a provision of a method and apparatus for manufacturing such wires or for manufacturing generally analogous types of articles. Broadly considered the method and apparatus are applicable to the grinding and/or tapering of various types of elongated metallic implements Insofar as the implement itself is concerned, an object of the invention is to provide a wire which may be pushed readily through the most tortuous conduit without jamming, sticking, buckling, twisting, or breaking and without the use of special skill in handling the wire.

Another object is to provide a fishing implement of this character which may be used and reused indefinitely without injury to the implement and which is entirely devoid of special carriage and reeling mechanism or other complications tending to add to the cost of the implement or to the difficulties of manipulating it.

The obvious method of curing the tendency of these fish wires to become permanently bent or broken would be to reinforce them, but the present invention works under a directly contrary principle actually weakening the leading end of the wire so that it serves as a sensitive feeler and negotiates bends in the conduit readily.

Insofar as the apparatus and method are concerned they are designed to permit the rapid inexpensive manufacture of wires of the class described without impairing the temper of the wires, without the need for special cooling means, and by a process of progressive grinding in which the usual difficulties of maintaining the device against the grind stones are entirely eliminated and the implement is substantially self-sustained in proper position to be ground.

The fish wire, which may be made of any suitable length in accordance with the length of the conduit through which it is to be thrust, has its leading end gradually tapered in the direction of the thickness of the wire. Such wires are always flat for convenient reeling thereof and the natural flexing tendency of the wires is, of course, in the direction of their thickness rather than the direction of their width. I increase this flexing tendency at the leading end of the wire by tapering it gradually for several feet (typically 15 to 20 feet) so that the leading end bends with great ease when it reaches a turn in the conduit.

Preferably the leading end of this tempered wire is bent into the form of a loop to afford a cam nose which will aid in guiding the wire around the corners of the pipes through which it feels its way. In forming this loop the extremity of the wire is heated and bent but by a requenching operation the nose of the wire is retempered so that the nose permanently retains its shape.

As the result of extensive experimentation I have discovered that the best results are obtained by tapering the wire in the direction of its thickness or to put it another way, so tapering it that its natural flexing tendency is enhanced at the leading or "feeler" end of the wire. Tapering it in the direction of the width of the wire may also be resorted to but such tapering is primarily for the purpose of aiding in centering the wire in the conduit. It is not desirable to initiate or induce flexure of the wire between parallel planes which are at right angles to the parallel planes defining the region in which free and normal flexure occurs.

The method which I utilize for forming this wire is to feed it very slowly between sets of staggered grindstones, the stones being so arranged with respect to each other that their normal tendency is to hold the wire stationary while applying sufficient grinding pressure thereto. During feeding of the wire, (and after feeding has been completed if desired) the wire is continuously longitudinally reciprocated so that no part of the wire remains in contact with a grinder long enough to be excessively heated and lose its temper. The slow continuous feeding movement is thus superimposed on the much more rapid reciprocating movement.

Insofar as the apparatus is concerned, it preferably includes upper and lower sets of relatively staggered grindstones with one row of stones adjustable with respect to the other to regulate the degree of taper. It includes an automatic means for reciprocating the wire during grinding, an automatic means for slowly feeding it through the grinders and an automatic mechanism for stopping feeding of the wire after the advance end has been passed through the grindstones, while permitting the continued reciprocation and further grinding to any extent desired.

The present application is a continuation in part of my prior copending application Serial No. 568,651 filed October 14, 1931.

The invention may be more fully understood from the following description in connection with the accompanying drawings, wherein, Fig. 1 is a side elevational view of a partially reeled fish wire embodying the invention, Fig. 2 is a plan view thereof, Fig. 3 is a somewhat diagrammatic sectional view showing the manner in which the wire has felt its way through a conduit preparatory to the attachment of an electrical conductor to be drawn back through the conduit with the wire, Fig. 4 is a view mainly in side elevation of a wire forming machine constructed in accordance with the invention, Fig. 5 is a somewhat enlarged transverse sectional view on the line 5—5 of Fig. 4, Fig. 6 is an enlarged side elevational detail with parts diagrammatically illustrated and showing the mechanism which electrically cuts off the wire feeding mechanism after a predetermined legnth of wire has been fed through the grinders, Fig. 7 is another outside elevational detail showing the means for supporting and adjusting the two bars which carry the grinding wheels, Fig. 8 is a considerably enlarged sectional detail view taken approximately on the line 8—8 of Fig. 7, Fig. 9 is a sectional view through a slightly modified form of a grindstone, Fig. 10 is a view partly in section and partly in elevation illustrating the details of the feed mechanism and Fig. 11 is a side elevational view of the feed mechanism.

Referring first to Figs. 1, 2 and 3 of the drawings I have illustrated a fish wire, the main portion or trailing end 10 of which is of tempered flat stock, that is to say, of greater width than thickness so that it may be conveniently reeled up as illustrated. The leading end of the wire designated at 10a is tapered in the direction of its thickness for a number of feet to afford a feeler portion and the extremity of this feeler is turned back upon itself to form a cam nose or loop 11. Fig. 3 illustrates the manner in which the wire may be pushed through a tortuous conduit, such as the end conduit 12 which may have been previously installed in a building structure, the leading end of the wire feeling its way through the conduit and finally emerging from the end thereof where an electric wire such as 13 may be conveniently attached thereto and drawn back through the conduit as the fish wire is retracted and reeled up. If desired the wire may also be tapered in the direction of its width, as disclosed in my copending application above referred to. Such tapering aids in centering the wire in the conduit but is not here illustrated.

Figs. 4 to 11 inclusive illustrate a semi-automatic machine for tapering the wires and the method used in the wire formation may be best understood from a description of the mahcine together with the description of certain subsequent loop-forming and tempering steps in which the machine has no part. The machine includes any suitable number of pairs of standards 14, the pairs being arranged in two rows and the upper end of each row of standards mounting longitudinally extending plates or girders 15. The girders 15 support a base plate 16 which prevents metal grindings from the grinding wheels above such plate from dropping onto the driving mechanism, etc., which will be later described.

Preferably, this base plate 16 also forms part of a tunnel 17 of sheet metal extending longitudinally of the machine completely housing the grinding mechanism and connected at one end to a suction fan 18 which draws off the dust produced by grinding and maintains continuous circulation of air over the grinding wheels and the material to assist in the cooling thereof. The side walls of the tunnel are formed by inwardly facing channel plates 16a.

Within the tunnel 17 and supported upon suitable standards indicated in dotted lines at 19 (Fig. 4) are a pair of longitudinally extending bars or beams 20 and 21, disposed in inclined relation with respect to each other. The lower bar is preferably horizontal and the upper one inclined with respect thereto for a purpose which will more fully hereinafter appear. The lower beam 20 is relatively fixed and carries an aligned series of horizontal shafts extending transversely of the machine. These shafts indicated at 23 may be mounted in ball bearings, if desired. At their inner ends (within tunnel 17) they carry the composite grinding wheels 25 which constitute the lower grinding wheel set and at their outer ends they carry pulleys 26 connected by suitable belting 27 to driving pulleys 28 on a longitudinally extending main drive shaft 29 arranged below the table 16.

Shaft 29 has bearings in the upper end of suitable standards 30 and illustratively is driven by an electric motor 31, mounted on a bracket 32 projecting from one end of the framework. The bar 21 affords bearings for a plurality of transversely extending horizontally disposed shafts 33, which like the shafts 23 are preferably arranged in ball bearings 24 in the carrier bar. Composite grinding wheels 34 are carried by the inner ends of the shafts 33 and staggered with respect to the lower set of grindstones 25. Pulleys 35 at the outer ends of these shafts are connected by the belting 27 to the driving pulleys 28 of the main shaft 29.

Where the shafts 33 pass through the tunnel wall 16a, this wall is provided with slots 36 of sufficient height to accommodate for vertical adjustment of the shafts 33. Shafts 33 move vertically only when the upper grindstone carrying bar 21 is adjusted with respect to the fixed bar 20 to thereby adjust the particular taper given to the material which is being worked on by the two sets of grindstones. This adjusting means illustratively comprises relatively massive screws 37 working through vertical screw threaded passageways 38 in bar 21 and locked in adjusted position by lock nuts 39 and resting at their lower ends upon the bar 20. The screws at their upper ends carry hand wheels 40 for turning them when the locking nuts 39 are released.

In order that the entire weight of the bar 21 may not be transmitted to the lower bar through the screws, the bars 20 and 21 are rigidly connected by brackets 41, the ends of these brackets being bolted as at 42 to the respective bars and the bolts working through slots 43 in the upper ends of the brackets so that the bolts may be reset after adjustment of the upper bar.

The type of grindstone illustrated consists of a plurality of disks of abrasive material 44 having metallic disks 45 spacing them apart. All of the disks 44 and 45 are clamped between metallic end disks 46 by screwing a nut 47 onto the reduced end 33a of the shaft 33 and forcing the disk sets against a shoulder 33b of such shaft. The spacer disks 45, as well as the clamping disks 46, are provided with beveled peripheries, indicated at 48, so that the work to be operated upon is guided into contact with the abrasive material 44, and there is no tendency of the wire being ground to shift laterally. In Fig. 9 a similarly constructed single instead of multiple disk is shown.

The feeding mechanism, which I shall later describe, is mounted upon a reciprocating table 50 at one end of the machine. The sides of this table mount brackets 51 carrying traction rollers 52 travelling on rails 53 mounted at the outer edges of relatively massive angle plates 54 bolted to the side frame members 15 at one end of the machine. The means for imparting a reciprocating motion to the table longitudinally of the machine includes a conventional change speed gearing illustrated diagrammatically at 55 and mounted upon a bracket 56 projecting inwardly from one of the legs 14. This gearing includes a pulley 57 driven by a belt 58 from the main drive shaft 29. The change speed gearing drives a relatively large disk 59, which near one edge is connected by a pitman 60 to a bracket 61 pendant from the table 50.

Thus, as the grinding wheels are continuously revolved by the drive shaft, the table 50 is continuously reciprocated. The wire or wires 10 to be tapered are mounted on suitable reels carried by brackets 62, fixed to the machine frame-work. These wires pass through a stationary guide structure 63 carried by the machine frame and are led between a pair of clamping, guiding and feeding rolls 64 and 65. The guide and feed rolls are mounted in a stationary frame 66 carried by the table 50 and illustrated in detail in Figs. 10 and 11.

The frame includes uprights 67 connected at their top by a cross piece 68. The lower relatively fixed feed roll 65 is carried on a shaft 69 journalled in the uprights and this shaft is driven slowly and continuously from a motor 70 mounted on the table and transmitting torque to the shaft through a speed reduction gearing 71 carried by bracket 72 also mounted on table 50. The speed changing mechanism should be of the type which will tremendously reduce the speed of the motor and effect a very slow rotation of the feed roll 65.

The upper relatively movable feed roll 64 includes trunnions 73 passing through the pendant legs of a guide yoke 74 slidable vertically in a trackway 75 within the upright 67. Spring pressure is applied on this guide yoke to force the upper roller into contact with the wire ends 10a. Illustratively, this pressure applying mechanism may include a leaf spring construction 76 carried by block 77, fixed to the lower end of a screw 78 working through the top member 68 and operated by a hand wheel 79. Standards 67 are slotted at 80 to accommodate for vertical movement of the trunnions 73 with their roller 64, these trunnions being journalled in furcations 81 of a forked handle lever 82 (see Fig. 4). The ends of these furcations are provided with a plurality of flat edge faces indicated at 83 spaced at different distances from the trunnion ends and by simply rocking the handle 82 upwardly to bring a new flat face 83 into contact with the handle supporting ledges 84 which project laterally from the standards 67, the roller 64 may be elevated against the action of its spring 76.

After the wires have been fed between the staggered sets of grinding wheels, the aligned wire ends impinge upon a cam plate 84 arranged within the dust tunnel at the opposite end of the machine from the feeding end. The aligned advancing ends of the wires are guided up this plate into contact with a switch arm 85, the continued thrust of the wire against the switch arm snapping the associated switch 86, which, as diagrammatically illustrated in Fig. 6, is in circuit with the feeding motor 70.

Thus, after a flat length of wire to be tapered, has been fed through the grinding rolls, with the continuous wire feed superimposed upon the reciprocating motion of the table 50, the feeding motor is cut off without interfering with the continued reciprocation and grinding of the wire, it being understood that motor 31 may be stopped at will after the grinding has been carried out to the desired extent.

While the operation of the machine will be more or less self-evident from the foregoing description, it may be briefly summarized as follows. One or more of the wires 10 have their leading ends manually inserted through the guides 63 and while the upper feed roll 64 is elevated, it is fed through the feed roll and led over the grooved periphery of the first grinding wheel. Motors 31 and 70 are then started, it being understood that the wire end is advanced far enough over and beyond the first grinding wheel so that it will not be dragged off of its wheel by the reciprocation of the table 50.

With both motors in operation the wire is fed slowly between the relatively staggered sets of upper and lower grinding stones and during this slow feeding action it is reciprocated by the movement of the table 50. The frequency and range of this reciprocation is sufficient to prevent any one section of the wire from remaining in contact with the grindstone long enough to become over-heated and lose its temper. In other words the reciprocating action permits the wire to be effectively air cooled during grinding. The grinding wheels themselves are ineffective to impart any feeding movement to the wire since inasmuch as all of the stones rotate in the same direction and an equal number of stones are provided in the upper and lower set, the feeding tendency of one set of stones will be completely offset by the other.

The rapidity with which the wire is tapered and ground down to the desired extent will depend somewhat on the nature of the wire itself and somewhat on the nature of the grindstones. In actual practice I find that when the advance end of the wire has traversed the entire set of grindstones, it sometimes is not sufficiently thin for my purpose. Therefore in practice after the leading end of the wire has gone through the grindstone and operated the switch 85 to cut off the feed motor 70, the reciproation of the table and the operation of the grindstones may be permitted to continue for a short period of time until the exact degree of taper desired has been effected.

Thereupon enough of the leading end of the wire is cut off to form a new (fully tapered) advance end which is heated to a sufficient extent so that it may be bent into the looped form desired and having been so bent it is retempered by quenching.

Such adjustments as the machine may require may be readily effected. The tension on the spring 76 of the feed roller 64 may be readily adjusted by the turning of the handle 79. The relative angles of the two grindstone carrying bars may be quickly changed or adjusted by loosening the nuts 42, manipulating the hand wheels 40 and then retightening the nuts.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent of the United States is:—

1. A machine of the class described including a pair of sets of relatively staggered grindstones, the axis of one set of stones being in a plane at a slight angle to the plane of the axis of the other set of stones, means for rotating all of the stones in the same direction, means for feeding an elongated metallic member to be ground slowly between the stones, and means for imparting a reciprocating movement to said member during the feed thereof.

2. A machine of the class described including a pair of sets of relatively staggered grindstones, the axes of one set of stones being in a plane at a slight angle to the plane of the axes of the other set of stones, means for rotating all of the stones in the same direction, means for feeding an elongated metallic member to be ground slowly between the stones, means for imparting a reciprocating movement to said member during the feed thereof and means for automatically stopping the feeding of said member without stopping the rotation of the stones or the reciprocation of said member.

3. A machine of the class described including a pair of sets of relatively staggered grindstones, the axes of one set of stones being in a plane at a slight angle to the plane of the axes of the other set of stones, means for rotating all of the stones in the same direction, means for feeding an elongated metallic member to be ground slowly between the stones and means for imparting a reciprocating movement to said member during the feed thereof, means for automatically stopping the feeding of said member without stopping the rotation of the stones or the reciprocation of said member, said means comprising a driving motor for the feed means, a switch in the motor circuit and means to guide the advance end of said member into position to snap the switch after said member has passed through the grindstones.

4. In a machine of the class described, a frame structure and grinding means mounted thereon including a plurality of grinding wheels adapted to act upon opposite sides of the elongated work to be ground, means for rotating the grindstones in the same direction and means to positively reciprocate the work and air cool the same during grinding, said reciprocating means including a work clamp, a table upon which said clamp is mounted and means to reciprocate the table, said clamp including clamping rolls and means for imparting a slow rotational movement of one of said rolls and thereby superimposing a continuous forward feed of the work on the reciprocating motion of the table.

5. In a grinding machine of the class described, a pair of relatively adjustable elongated frame members, a pair of sets of relatively staggered grindstones carried by said members and means for adjusting the angle of one of said grindstone carrying members to the other, whereby the grindstones may serve to taper the article being ground.

6. In a grinding machine of the class described, a pair of relatively adjustable elongated frame members, a pair of sets of relatively staggered grindstones carried by said members and means for adjusting the angle of one of said grindstone carrying members to the other, whereby the grindstones may serve to taper the article being ground, a casing surrounding said grindstones and carrier members and means for inducing a current of air through the casing to aid in air cooling the work passing between the grindstones.

7. In a grinding machine of the class described, a pair of relatively adjustable elongated frame members, a pair of sets of relatively staggered grindstones carried by said members and means for adjusting the angle of one of said grindstone carrying members to the other, whereby the grindstones may serve to taper the article being ground, means to drive all of the grindstones in one direction and means to reciprocate the article to be ground while slowly and continuously feeding it between the grindstones.

8. In a grinding machine of the class described, a pair of relatively adjustable elongated frame members, a pair of sets of relatively staggered grindstones carried by said members and means for adjusting the angle of one of said grindstone carrying members to the other, whereby the grindstones may serve to taper the article being ground, means to drive all of the grindstones in one direction and means to reciprocate the article to be ground while slowly and continuously feeding it between the grindstones and means for automatically stopping the feed of the article after a predetermined length thereof has been fed through the grindstones.

9. In a machine of the class described, a pair of relatively staggered sets of grindstones between which a spring wire is adapted to be operated upon for tapering the wire, means for continuously feeding the wire through the grindstone and means for reciprocating the wire and its feeding means whereby overheating of the wire is prevented.

10. In a machine of the class described, a pair of relatively staggered sets of grindstones between which a spring wire is adapted to be operated upon for tapering the wire, means for continuously feeding the wire through the grindstone and means for reciprocating the wire and its feeding means whereby overheating of the wire is prevented, there being an equal number of grindstones in each set and the friction of one set of grindstones opposing the friction of the other to prevent any feeding of the wire by the stones.

11. A method of tapering an elongated tempered wire without destroying the temper thereof which consists in slowly feeding the wire between relatively inclined sets of relatively staggered grindstones and effecting relative reciprocation of the wire and stones during feeding of the former to prevent localized overheating.

12. A method of tapering an elongated tempered wire without destroying the temper thereof which consists in slowly feeding the wire between relatively inclined sets of relatively staggered grindstones and effecting relative reciprocation of the wire and stones during feeding of the former to prevent localized overheating and while driving the grindstones all in one direction.

13. A method as set forth in claim 11 wherein the wire is reciprocated and the axes of the stones held in relatively fixed position.

14. A method of tapering a piece of tempered metal without destroying the temper thereof which consists in slowly feeding the metal between relatively inclined sets of grindstones and simultaneously continuously reciprocating the metal with respect to said stones.

JENS T. SCOTT.